United States Patent [19]

Noble

[11] E Re. 31,482

[45] Reissued Jan. 3, 1984

[54] METHOD FOR CENTRIFUGAL CASTING AND ARTICLES SO PRODUCED

[76] Inventor: Charles H. Noble, 2307 Manassas Dr., Birmingham, Ala. 35213

[21] Appl. No.: 202,755

[22] Filed: Oct. 31, 1980

Related U.S. Patent Documents

Reissue of:

[64] Patent No.: 4,124,056
Issued: Nov. 7, 1978
Appl. No.: 778,705
Filed: Mar. 17, 1977

[51] Int. Cl.[3] ..... B22D 13/02; B22C 3/00; B22C 13/10

[52] U.S. Cl. ..... 164/114; 164/17; 164/33; 164/37; 164/72; 164/122; 164/138; 164/164

[58] Field of Search ..... 164/17, 33, 37, 72, 164/114, 138, 161, 164, 175, 176, 177, 178, 122

[56] References Cited

U.S. PATENT DOCUMENTS

| | | | |
|---|---|---|---|
| 1,581,635 | 4/1926 | Henry et al. | 164/33 |
| 2,731,690 | 1/1956 | Coupland, Jr. et al. | 164/114 X |
| 3,056,692 | 10/1962 | Kitada | 164/33 X |
| 3,437,131 | 4/1969 | Ornitz | 164/33 X |

FOREIGN PATENT DOCUMENTS 30649 10/1942 Poland .

*Primary Examiner*—Gus T. Hampilos

*Attorney, Agent, or Firm*—Roylance, Abrams, Berdo & Farley

[57] ABSTRACT

Tubular metal articles are produced by centrifugal casting in a rotary metal mold lined by centrifugally distributing a quantity of a dry finely particulate free flowing refractory material on the active mold surface with the quantity being in excess of that required for the lining, densifying the layer by rotating the mold at a rate such that the refractory layer is subjected to centrifugal force adequate to establish an equivalent specific gravity of at least 7.5, determined by multiplying the actual specific gravity of the refractory material by the number of gravities of centrifugal force, contouring the densified layer and removing the excess refractory material, rotating the mold at the casting rate and then introducing the molten metal for casting while continuing to rotate the mold at least that rate. Articles so cast have relatively smooth outer surfaces which require only finish machining. The invention employs no additives and thus eliminates the need for venting the metal mold, provides a relatively thick lining of predetermined insulating capability so as to control the grain structure of the cast metal, eliminates the usual end cores, and allows the refractory material to be recycled. The invention is particularly useful for casting articles, such as cylinder liner blanks, from grey iron, such articles having an outer enlargement, typically a transverse outer end flange. Cast according to the invention, such articles have Type A graphite throughout the entire inner surface and for at least a substantial portion of the thickness of the flange or other outer enlargement.

21 Claims, 13 Drawing Figures

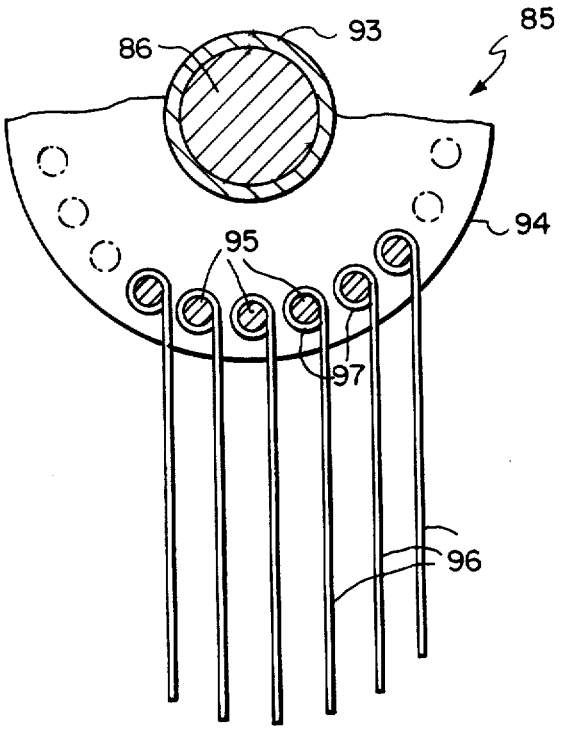
FIG. 7
FIG. 9
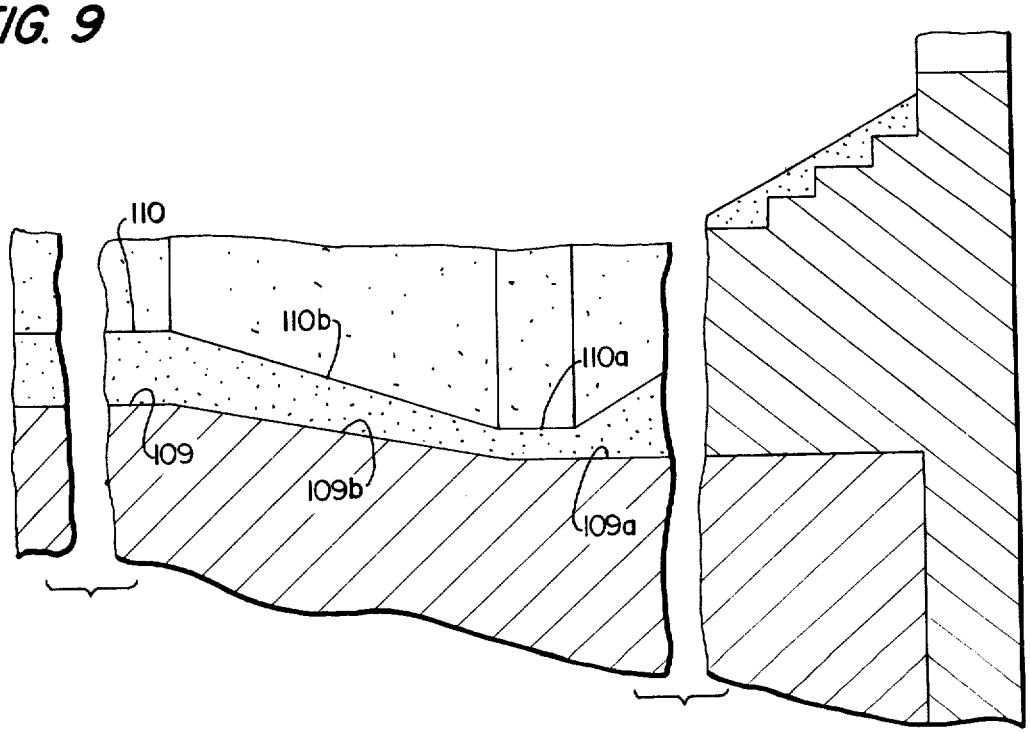

METHOD FOR CENTRIFUGAL CASTING AND ARTICLES SO PRODUCED

Matter enclosed in heavy brackets [ ] appears in the original patent but forms no part of this reissue specification; matter printed in italics indicates the additions made by reissue.

*RELATED APPLICATION*

*Apparatus disclosed herein is disclosed and claimed in my copending application Ser. No. 89,306, filed Oct. 30, 1979 and now U.S. Pat. No. 4,260,009.*

BACKGROUND OF THE INVENTION

It has long been common practice to cast tubular metal articles centrifugally, using a permanent mold which has an active mold surface of circular transverse cross-section, the mold being rotated about the longitudinal axis of the active mold surface. Centrifugal casting molds are made of metal which has a melting point which may not be markedly different from that of the metal being cast, and it is therefore necessary to cover the active mold surface with a lining of a material which will protect the mold from damage by contact with the molten casting metal, prevent the casting from picking up material from the mold surface, and allow the finished casting to be separated from the mold. One method employed by prior art workers for lining centrifugal casting molds has been to apply to the active mold surface a slurry of a finely particulate refractory material, typically zircon powder or silica powder, that method having been used for stationary, non-centrifugal molds as disclosed in U.S. Pat. No. 1,662,354 to Harry M. Williams, and adopted for centrifugal casting, as described in U.S. Pat. No. 3,527,285 to Fred J. Webbere. While they have achieved considerable acceptance, such practices have presented substantial disadvantages, particularly because of the need for venting to dispose of water vapor generated during casting, and because the coatings provided on the mold surface have not always been adequately strong and uniform and have tended to be penetrated by the molten metal being cast, with resulting roughness of the cast surface and increased machining difficulties due to presence of refractory particles in the cast metal. In efforts to avoid such deficiencies, it has been proposed to employ resin binders and other non-inert ingredients as shown for example in U.S. Pat. No. 3,056,692 to Koshiro Kitada, but such coatings are unduly expensive and tend to generate gaseous products at casting temperatures so that the mold must be vented. As disclosed for example in U.S. Pat. No. 3,110,067 to Donald C. Abbott, it has been proposed to spray a resin binder onto the surface of a heated relatively thick pre-formed refractory layer with the intent of eliminating the need for venting the mold but, at best, that practice still requires the use of both a relatively expensive refractory material and a relatively expensive resin.

It has also been proposed to apply only the particulate refractory material, without water or other liquid carrier material and without additive binders such as bentonite or resin, primarily to control the grain structure of the cast metal. As disclosed in U.S. Pat. No. 1,949,433 to Norman F. S. Russell et al, such methods employ a carrier gas to carry the particulate refractory material onto the active mold surface immediately in advance of the casting metal and depend upon centrifugal force to establish a very thin coating layer of the refractory material, said to be limited to not more than 0.025 mm. in thickness. Such methods have been adopted for casting some articles, such as pipes, which do not require a particularly smooth outer surface, but are not suitable for products, such as engine cylinder liners, which require a relatively smooth outer surface free of chilled iron. The as-cast surface is usually quite rough, so that substantial machining would be required for finished castings with a smooth outer surface, and the nature of the thin coating of particulate refractory material has been such that particles of the refractory material are picked up by the cast article and interfere seriously with machining by slowing the machining rate and drastically reducing cutting tool life. Use of a thin coating of refractory material also limits the practice to production of articles which have no outer enlargements unless, as in the case of a pipe with an end bell, the enlargement can be outwardly tapering and located at the very end of the mold. Further, such very thin linings do not provide thermal insulation adequate to delay the solidification of the molten iron, when iron is the metal being cast, sufficiently to cause Type A graphite to be formed, a definite requirement for cast articles such as cylinder liners and bearings.

A further disadvantage of prior art methods arises from the relative cost of the refractory material and the difficulty in recovering that material, after casting, for reuse. Materials such as zircon flour have a per pound cost greater than that of the metal being cast. When additive materials such as clays, bentonite or resins are employed, recycle of the refractory material is impractical. When only a thin layer, such as that disclosed in U.S. Pat. No. 1,949,433, is employed, much of the refractory material is simply lost, by being picked up by the casting and otherwise, so that recovery is at best difficult and costly.

OBJECTS OF THE INVENTION

It is accordingly one object of the invention to devise a method for producing tubular metal articles by centrifugal casting which provides a more effective refractory covering for the active mold surface without use of a liquid carrier, and without use of binders or other additives, thus eliminating the need for venting the metal mold.

Another object is to provide such a method in which the refractory covering is of such nature that essentially none of the refractory particles are picked up by the casting and the as-cast surface is especially smooth and more easily machined.

A further object is to devise such a method in which the refractory covering layer is relatively thick and can be contoured to the precise profile desired for the outer surface of the casting, limited only by the angle of repose of the refractory material employed so that, e.g., transverse annular outer flanges need not be formed by a machining of the casting or by using a machined split mold.

Another object is to provide such a method in which the refractory material can be recovered with high efficiencies and recycled for successive castings.

A further object is to provide particularly advantageous apparatus for carrying out the method.

Another object is to devise a combined refractory supply, contouring tool, and excess refractory removal device.

Yet another object is to provide apparatus for carrying out the method and in which the need for mold end cores is eliminated.

A still further object is to provide a method and apparatus for centrifugally casting iron alloy articles, such as cylinder liner blanks, which have an outer flange or other enlargement, with the graphite in the casting being predominantly AFA Type A throughout, including at least most of the thickness of the outer enlargement.

SUMMARY OF THE INVENTION

According to method embodiments of the invention, a quantity of finely particulate free flowing refractory material having a melting point higher than the temperature of the molten metal to be cast, a specific gravity of at least 2.5, and a particle size such that at least 95% of the particles are smaller than 105 microns is supplied to a mold having an active mold surface of circular transverse cross-section and the mold is rotated to distribute the refractory particles over the active mold surface. The resulting layer is then densified by rotating the mold at a rate such that the layer is subjected to centrifugal force adequate to establish an equivalent specific gravity, as hereinafter defined, of at least 7.5 The inner surface of the densified layer is then contoured by positioning against the inner portion of the layer, while rotating the mold at at least the rate employed for densifying the layer, a contouring tool having a working edge which extends longitudinally of the mold and which has a profile identical to that desired for the outer surface of the article to be cast.

The initial quantity of particulate refractory material introduced into the mold is more than is required for the finished refractory layer, and the excess refractory material is removed from the lined mold concurrently with the contouring operation. The shape and position of the contouring tool and the quantity of particulate material are such that the thinnest portion of the contoured refractory layer (usually the portion which defines an outer flange or other enlargement of the cast article) has a radial thickness equal to at least 5 times the maximum dimension for the predominant fraction of the particulate material and significantly greater than the maximum dimension of the largest particle in the particulate material, so that even the thinnest portion of the layer, in the finished lining, will present a relatively smooth surface to the molten metal.

With the refractory layer thus contoured, the molten metal to be cast is introduced while the mold is rotated at a rate providing a centrifugal force at the layer of at least 10 gravities until the molten metal has covered the inner surface of the densified refractory layer. The cast metal then solidifies, rotation of the mold with the mold being cooled conventionally if necessary, and the casting is withdrawn from the mold, withdrawal being accompanied by substantial disintegration of the refractory layer. During withdrawal of the casting, the refractory material is recovered, as by means of a vacuum collector, the recovered refractory material being sized to eliminate debris, and delivered to storage for reuse in additional casting operations.

Particularly advantageous apparatus embodiments provide a combined supply trough, contouring tool and excess refractory material collector which extends for the effective length of the mold and is so arranged that rotation of the trough about a longitudinal axis to a predetermined rotational position automatically positions the edge of the contouring tool in proper spaced relation to the active mold surface.

In order that the manner in which the foregoing and other objects are achieved according to the invention can be understood in detail, particularly advantageous embodiments thereof will be described with reference to the accompanying drawings, which form part of the original disclosure of this application, and wherein:

FIG. 7 is a fragmentary transverse sectional view of a brush employed in the apparatus of FIG. 6.;

FIG. 9 is a view, similar to FIG. 2A, illustrating a refractory lining according to another embodiment of the invention.

DETAILED DESCRIPTION OF THE METHOD

Figure 1:
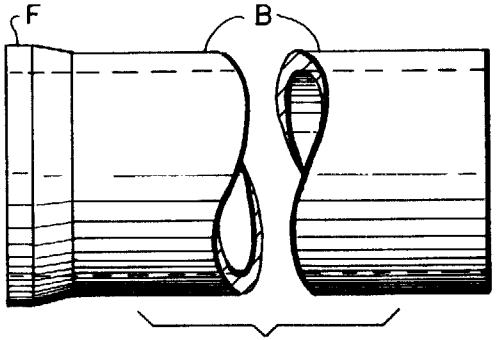
FIG. 1 is a side elevational view of a cast article typical of articles produced according to the invention.

Method embodiments of the invention provide a relatively thick layer consisting entirely of fine refractory particles as a lining for the active surface of a centrifugal casting mold, with the layer being precisely contoured (limited only by the angle or repose of the particulate refractory material employed) to conform to the shape desired for the outer surface of the cast article and with the contoured surface of the layer being so dense and hard that it is not invaded by the molten metal during casting. The invention stems from discovery that, when zircon flour having a specific gravity of 4.56 and a fineness such that only a minor proportion of the particles are larger than 74 microns and a predominant proportion of the particles are smaller than 43 microns, is introduced into a centrifugal casting mold, without any liquid carrier, binders or other additives (thus eliminating the need to vent the metal mold), and the mold is rotated to distribute the refractory material in the form of a relatively thick layer covering the active surface of the mold, that layer can be densified solely by rotating the mold to apply a centrifugal force adequate to establish an equivalent specific gravity for the layer of at least 7.5 (as hereinafter defined), that the densified layer can be contoured to the shape required for the article to be cast, that the contoured layer can be hardened simply by increasing the rate of rotation of the mold, and that the nature of the lining thus produced is such that the as-cast outer surface of a tubular article centrifugally cast in the mold will be markedly smoother than that of an article cast against a conventionally produced refractory lining of resin-bonded silica sand and will be essentially free of zircon flour particles.

Attempts to achieve the same results with a zircon sand, having a particle size distribution such that 77% was retained on a 140 mesh screen (and therefore was larger than 105 microns), were unsuccessful. Though a stable lining of the zircon sand was established when the mold was rotated at a rate applying 19 gravities of centrifugal force to the sand, the molten metal penetrated the lining when an attempt was made to cast grey iron at 50 gravities, and the as-cast surface contained such an amount of zircon sand as to make the casting unsatisfactory.

Considering a mold having an inner diameter such that, when the refractory lining is completed the inner diameter of the lining is 5.45 inches, the number of centrifugal gravities G resulting at the active surface of the lining can be determined by the equation $$[G = [(RPM)^2 \times 5.45]70{,}400] \quad \frac{(RPM)^2 \times 5.45}{70{,}400} \qquad (1)$$

and a centrifugal force of 50 gravities is attained when the mold is rotated at approximately 800 r.p.m. With the same mold rotated at 900 r.p.m., a centrifugal force of 62 gravities will be applied to the refractory material on the active mold surface, and rotation of the mold at about 1138 r.p.m. will provide a centrifugal force of 100 gravities.

Using a finely particulate refractory material of known specific gravity, that material can be characterized as having an equivalent specific gravity, when subjected to centrifugal force during rotation of the mold, the equivalent specific gravity being determined according to the equation $$\text{Eq.Sp.Gr.} = \text{Actual Sp.Gr.} \times G \quad (2)$$

and the equivalent specific gravity of zircon flour with an actual specific gravity of 4.56 is therefore 65 under 14.25 gravities of centrifugal force.

In general, the method succeeds because refractory linings made according to the method consist of very small particles and the particles are so packed together in the lining that the voids at the surface of the lining are too small to be entered by the molten metal. This result can be achieved so long as the refractory material has an actual specific gravity of at least 2.25, does not melt or decompose at temperatures near the temperature of the molten metal being cast, and is of such fineness that at least 95% of the particles are smaller than 105 microns and, further, in establishing the lining on the active surface of the mold, the mold is rotated at a rate such that the equivalent specific gravity (determined by Equation 2) of the refractory material is at least 7.5 at the time the layer of refractory material is subjected to contouring. Centrifugal force adequate to provide an equivalent specific gravity of 7.5 causes the small particles to be packed together so tightly that the lining is at maximum bulk density. An increase in the mold rotation rate, after the lining has been densified, increases the hardness of the refractory layer but does not make the layer denser or change its dimensions.

The method is best practiced with zircon flour, i.e., finely milled zircon sand, composed chiefly of zirconium silicate ($ZrSiO_4$), having an actual specific gravity of 4.56 and a particle size such that more than 75% of the particles are smaller than 43 microns, with the layer being established by rotating the mold at a rate providing a centrifugal force of at least 19 gravities for contouring, the rate of rotation then being increased to at least 40 gravities for casting, with such increase resulting in hardening of the densified and contoured layer. Using silica flour with a specific gravity of 2.6 and approximately the same particle size distribution, best results are attained when the rate of mold rotation generates a centrifugal force of at least 33 gravities for densification of the layer prior to contouring. With magnesite (magnesium oxide, dead burned), at a specific gravity of 3.58 and substantially all particles smaller than 74 microns, best results are achieved with at least 24 gravities of centrifugal force for densification.

The invention is especially advantageous in the centrifugal casting of tubular articles the outer surfaces of which have at least one transverse annular portion of a diameter different from that of the main body of the article. The conventional internal combustion engine cylinder liner blank seen in FIG. 1 is typical of such articles and includes a right cylindrical tubular main body B having an outwardly directed transverse enlargement F from which the usual end flange is to be machined. An advantage of the method is that it allows establishment of relatively thick lining layers of the particulate refractory material and that such layers can be contoured to match precisely the shape desired for the cast article, limited only by the angle of repose of the particulate refractory material employed. Thus, as later described in detail in connection with casting cylinder liner blanks such as shown in FIG. 1, the refractory layer is made thicker than the radial height of the enlargement F, that dimension being typically 0.14 inch (3.55 mm), and is contoured by means of an elongated contouring tool of such longitudinal profile as to form in the refractory layer a transverse annular groove matching the shape of enlargement F. The thickness of the layer at the bottom of the groove is made as small as possible commensurate with achieving the desired densification and surface smoothness of the layer and with providing adequate thermal insulation to control the grain structure of the cast-metal. Thus, the thickness of the layer at the bottom of the groove, which is the thinnest portion of the layer, is equal to at least 5 times the maximum dimension for the predominant fraction of the particulate refractory material (at least $5 \times 43 = 215$ microns or 0.0085 in. for the linings made with the preferred zircon flour) and in all events significantly greater than the maximum dimension of the largest particle in the particulate refractory material. FIG. 2A is typical for a cylinder liner blank having an outer diameter of 5.45 in. (138.43 mm.) at the flange enlargement F and of 5.17 in. (131.32 mm.) throughout the main tubular body B. Throughout most of its length, the refractory layer has a radial thickness X of 0.155 in. (3.94 mm.) and, at the bottom of the groove, the layer has a radial thickness Y of 0.015 in. (0.381 mm.), it being noted that 0.381 mm. is approximately 8.8 times as large as the 43 micron approximate size for 75% of the zircon flour employed.

Employing a lining such as that illustrated in FIG. 2A and formed according to the invention, grey iron cast against the thicker main portion of the refractory will be characterized by predominantly AFA Type A graphite at the inner surface and throughout the thickness of the piece and grey iron cast against the groove defined by the lining will be characterized by predominantly AFA Type A graphite at the inner surface and throughout most of the thickness of the enlargement. This occurs because, while the thinner lining defining most of the groove does not offer as much thermal insulation as does the thicker main portion of the lining, additional heat is continually supplied to the metal in the groove from the better insulated main body of metal, and the more rapid transfer of heat through the thinner lining portion at the bottom of the groove therefore does not result in such a rapid chilling of the metal in the groove as would inhibit formation of Type A graphite. The phenomenon is accentuated because the metal of the mold at the thinner portion of the refractory lining receives significantly more heat than does the rest of the mold, and the temperature differential (and therefore the rate of heat loss from the molten metal or chilling effect) is decreased. Maintaining the mold temperature between 300° and 500° F. also aids in reducing the chilling effect of the mold. Surprisingly, such contouring of the refractory layer is easily accomplished after densification of the layer, and the contour then persists in precise dimension and form (limited only by the angle or repose of the particulate refractory material) throughout the casting operation so long as the rotational speed of the mold is maintained over the time period between contouring of the layer and introduction of the molten casting metal.

To form the lining, an amount of the finely particulate material significantly in excess of that actually required for the lining is introduced into the mold, with the mold stationary or rotating at any desired rate; the entire quantity of particulate material is centrifugally distributed over the active mold surface to form an even layer having a thickness significantly greater than that desired for the lining, the mold rotation is then increased to densify the layer, the inner surface of the layer is then contoured, with the contouring step reducing the thickness of the layer to the precise dimension desired, and the excess refractory material is recovered concurrently with the contouring step. If an excess of refractory material is not employed, the centrifugally deposited layer cannot be contoured and, further, it is difficult to attain an adequately smooth surface on the finished lining. There is a tendancy for the inner surface of the centrifugally deposited layer to be slightly corrugated, so as to present a shallow hill-and-valley configuration extending circumferentially. The inwardly protruding "hills" can be removed easily with a straight edged contouring tool but, if that is done, the inner diameter of the lining would be excessive if only that amount of particulate refractory material required for the lining had been introduced.

Contouring of the initial refractory layer can be accomplished while the mold is rotating at the rate employed for densification, and hardening of the contoured layer occurs as a result of increasing the mold rotation rate to that desired for casting, when the densification rate is lower than the casting rate. Using zircon flour in which most of the particles are finer than 43 microns, excellent results are obtained when contouring is accomplished while the mold is rotating to provide 20 gravities of centrifugal force, the contoured lining then maintaining its precise contoured shape and dimensions (again limited only to the angle of repose of the zircon flour) even though, after contouring, the rate of rotation of the mold is drastically increased to provide, e.g., 50–100 gravities of centrifugal force for the actual casting step.

A particular advantage of the method is that finish machine time and costs are reduced significantly in comparison to prior art practices such as the use of silica sand and resin binder to establish the refractory lining layer. On the one hand, the as-cast outer surface of articles produced according to the invention is smoother and can be closer to the final dimensions, so that less machining is required. On the other hand, "burn-in" or sticking of the refractory particles is virtually eliminated so that the article can be finish machined more quickly and with markedly longer cutting tool life than has heretofore been attained.

Another advantage is that, since no binders or other additives need be employed, the refractory material can be recovered as the cast article is removed from the mold and, after screening to remove debris, is used again to practice the method. When zircon flour is employed as the refractory material, high recycle rates are achieved, and easy recovery of the material after casting is accomplished using vacuum equipment. The method therefore is particularly economical because of savings of the relatively expensive refractory material.

The method is generally applicable to centgrifugal casting of metals and, typically, can be used for casting grey iron, alloyed cast irons, ductile iron, steel, bronze, brass and aluminum.

The following examples are illustrative:

EXAMPLE 1

Figure 2:
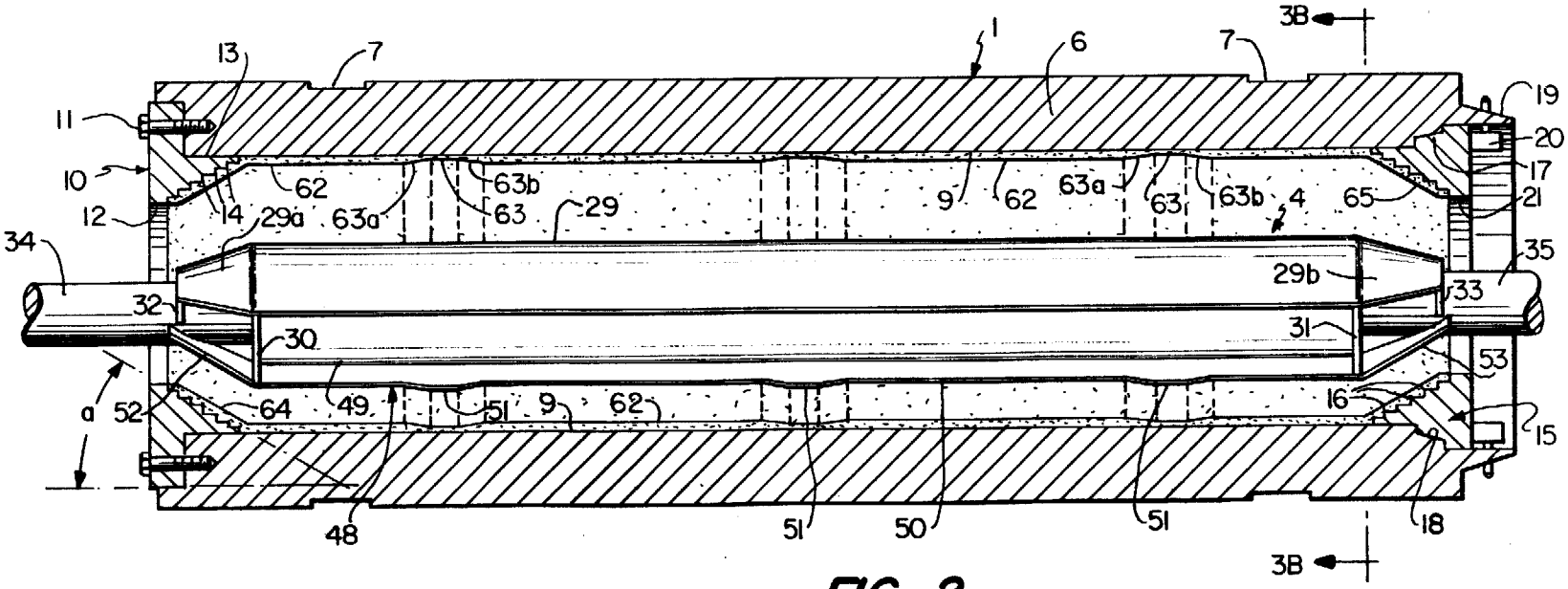
FIG. 2 is a longitudinal vertical sectional view, with some parts shown in side elevation, of an apparatus according to one embodiment of the invention and with which method embodiments can be practiced.
Figure 2A:
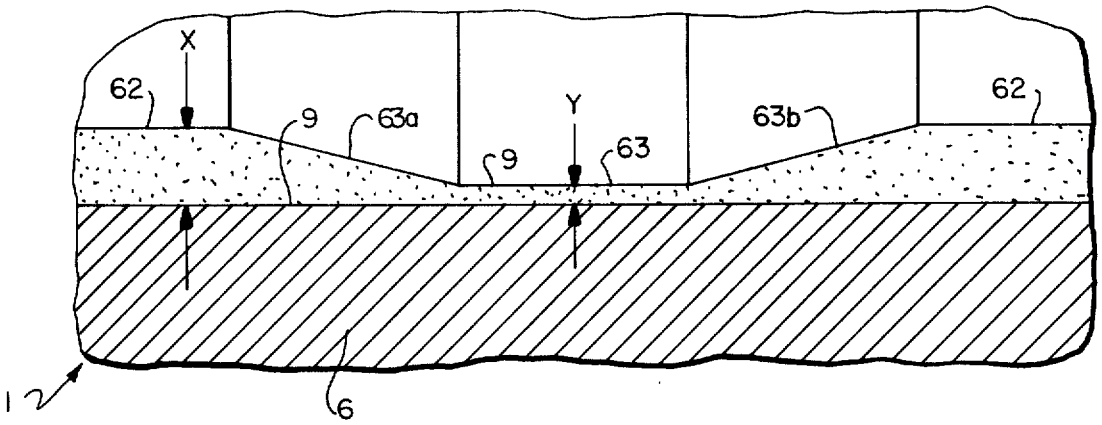
FIG. 2A is a fragmentary sectional view, greatly enlarged as compared to FIG. 2, illustrating a portion of a refractory lining according to the invention.
Figure 3:
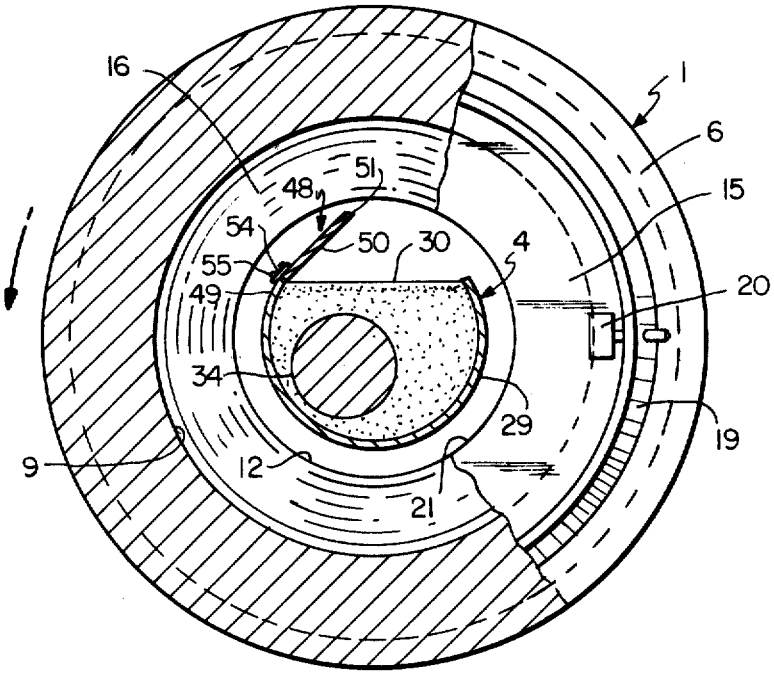
FIGS. 3-3B are transverse sectional views, with some parts shown in end elevation, views of the apparatus, taken generally on line 3—3, FIG. 2, showing the combined supply trough and contouring tool in different rotational positions, FIG. 3B illustrating the position seen in FIG. 2.
Figure 4:
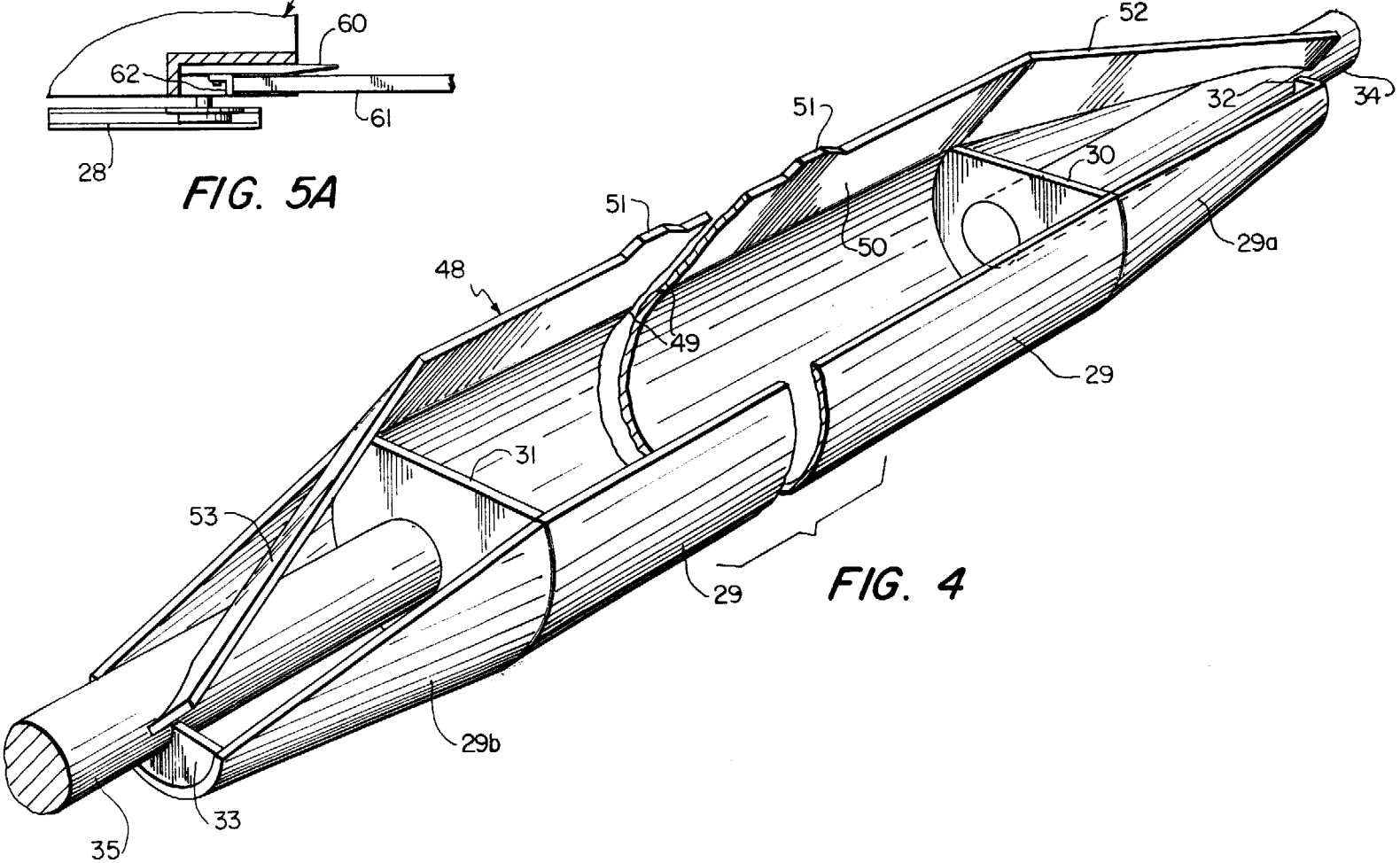
FIG. 4 is a perspective view of a combined trough and contouring tool forming part of the apparatus of FIG. 2.

Cylinder liner blanks having the configuration seen in FIG. 1 were cast centrifugally from grey iron, using apparatus constructed generally as illustrated in FIGS. 2–4 and later described. The combined trough and contouring tool was charged with an amount of zircon flour equal to 1½ times that required for the refractory lining layer. The zircon flour employed had a specific gravity of 4.56 and the following particle size distribution:

| | |
|---|---|
| On 200 mesh[1] (larger than 74 microns) | 2.5% |
| On 325 mesh (43–74 microns) | 11.0 |
| On 400 mesh (38–43 microns) | 6.7 |
| Through 400 mesh (smaller than 38 microns) | 78.9 |

[1]U.S. Sieve Series

The mold was totally unvented and had a nominal inner diameter such that, with the main body portion of the finished refractory lining having a thickness of 0.155 in. (3.94 mm.) the finished lining would correspondingly have an inner diameter of 5.45 inches (13.85 cm). The combined trough and contouring tool was introduced into the mold to the position seen in FIG. 3, and then rotated counterclockwise (as viewed) to the position shown in FIG. 3A to discharge all of the zircon flour, the mold not yet being rotated. The mold was then rotated at 500 r.p.m. in a counterclockwise direction, as viewed in FIGS. 3-3B, to distribute the total amount of refractory material uniformly over the inner surface of the mold, the lining being subjected to 19.35 gravities as a result of the centrifugal force developed at 500 r.p.m. Concurrently, the combined trough and contouring tool was rotated clockwise, as viewed, to bring the edge of the contouring tool to its active position, seen in FIG. 3B. With the edge of the contouring tool in that position, and with the blade-like body of the tool extending generally chordwise of the mold, the contouring tool removed the excess refractory material and that material was directed by the contouring tool back into the trough. The combined trough and contouring tool was maintained in the position shown in FIG. 3B for a few seconds, to make certain that all of the excess refractory material had been recovered, and was then rotated clockwise, as viewed, back to the initial position, shown in FIG. 3. The combined trough and contouring tool was then withdrawn axially from the mold, the recovered excess refractory material remaining in the trough for use in the next casting operation. No additives or carrier materials were employed. The contouring tool formed grooves in the zircon flour layer with each groove matching the enlargements F for two end-to-end liner blanks, the thickness of the layer at the bottoms of such grooves being approximately 0.38 mm. and the thickness of the main body of the layer thus being approximately 3.94 mm. Elapsed time from discharge of the zircon flour into the mold to withdrawal of the combined trough and contouring tool from the mold was 1 min. Rotation of the mold, with the contoured zircon flour lining layer in place, was increased to 800 r.p.m., and molten grey iron was introduced in conventional fashion, using a right angle pouring boot, with such rotation of the mold being continued until the casting had cooled and solidified. The chemical composition of the iron employed was:

| Constituent | Percent by Wt. |
|---|---|
| Carbon | 2.94 |
| Silicon | 2.41 |
| Chromium | 0.46 |
| Nickel | 0.30 |
| Copper | 1.04 |
| Molybdenum | 0.37 |

The mold was then stopped, the pouring boot removed, one end ring removed from the mold, and the casting then withdrawn axially. During such withdrawal, the zircon flour layer disintegrated and the zircon flour was recovered for re-use. On inspection of the casting, it was found that the as-cast outer surface was clean and smooth and free of zircon flour particles. The outer dimensions were within a tolerance of ±0.01 inch [(25.4 mm.)] *(0.254 mm.)* . Finish machining was accomplished with markedly less tool wear and machining time than for the same part cast in a mold in which the refractory lining was formed on an aqueous slurry of silica sand or of a silica sand-resin composition. The graphite structure was predominantly AFA Type A throughout the entire wall thickness of the main body portion of the article and was AFA Type A at the inner surface and for more than one half of the radial thickness of the end flange enlargement.

The casting was withdrawn from the mold with the aid of a fork truck. A piece of cleaned corrugated metal was placed on the floor below the end of the mold from which the casting was withdrawn and the refractory material which did not fall free was wire-brushed off the casting by hand. The collected refractory material was poured from the corrugated metal sheet through a screen into a container and was reused successfully with fresh make up material to form the lining for another casting operation.

EXAMPLE 2

The procedure of Example 1 was repeated but with silica flour substituted for the zircon flour of Example 1. No carrier liquid or additives were used. The silica flour had a specific gravity of 2.6 and the following particle size distribution:

| | |
|---|---|
| On 200 mesh (over 74 microns) | 1.1% |
| On 270 mesh (53–74 microns) | 2.0% |
| Through 325 mesh (smaller than 43 microns) | 96.0% |

The as-cast outer surface of the casting was found to be very rough and was judged to be so rough as to require excessive machining, with a further loss because it would be necessary to compensate for poor dimensional accuracy of the casting.

EXAMPLE 3

The procedure of Example 2 is repeated, except that the rate of rotation of the mold is increased from 800 r.p.m. (50 gravities) to 1180 r.p.m. (107.7 gravities) providing an equivalent specific gravity of 280. The as-cast outer surface of the casting has a smoothness approaching that attained with a conventional lining of silica sand with resin binder.

EXAMPLE 4

The procedure of Example 1 was repeated except that magnesium oxide, purchased commercially as dead-burned magnesite, was substituted for the zircon flour, again with no carrier liquid or additives being used. The magnesium oxide had a specific gravity of 3.58 and all particles were smaller than 74 microns. The casting was found to have an outer surface too rough for desired minimum finish machining.

EXAMPLE 5

The procedure of Example 4 is repeated except that the rate of rotation of the mold is increased from 800 r.p.m. (50 gravities) to 1015 r.p.m. (80 gravities), so that the equivalent specific gravity is 286. The casting has an as-cast outer surface which has a smoothness and dimensional accuracy approaching those obtained with a conventionally produced lining of silica sand with resin binder.

EXAMPLE 6

The procedure of Example 1 was repeated except that mullite flour (calcined kyanite) is substituted for zircon flour, again in the dry particulate form, without binders or any additives. The mullite flour had a specific gravity of 3.0 and the following particle size distribution:

| | |
|---|---|
| On 200 mesh (larger than 74 microns) | 1% |
| On 270 mesh (53–74 microns) | 2% |
| Through 325 mesh (smaller than 43 microns) | 96% |

The casting obtained had a very rough as-cast outer surface and would require excessive finish machining.

EXAMPLE 7

The procedure of Example 6 is repeated except that the speed of mold rotation is increased from 800 r.p.m. (50 gravities) to 1100 r.p.m. (95 gravities), providing an effective specific gravity for the refractory lining of 282. The finished casting has an outer surface smoothness approaching that attained with a conventional silica sand and resin binder lining.

APPARATUS [EMBODIMENT] OF FIGS. 2-8

Figure 5A:
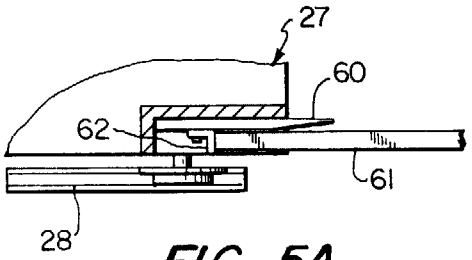
FIG. 5A is a fragmentary top elevational view of a portion of the apparatus shown in FIG. 5.
Figure 5:
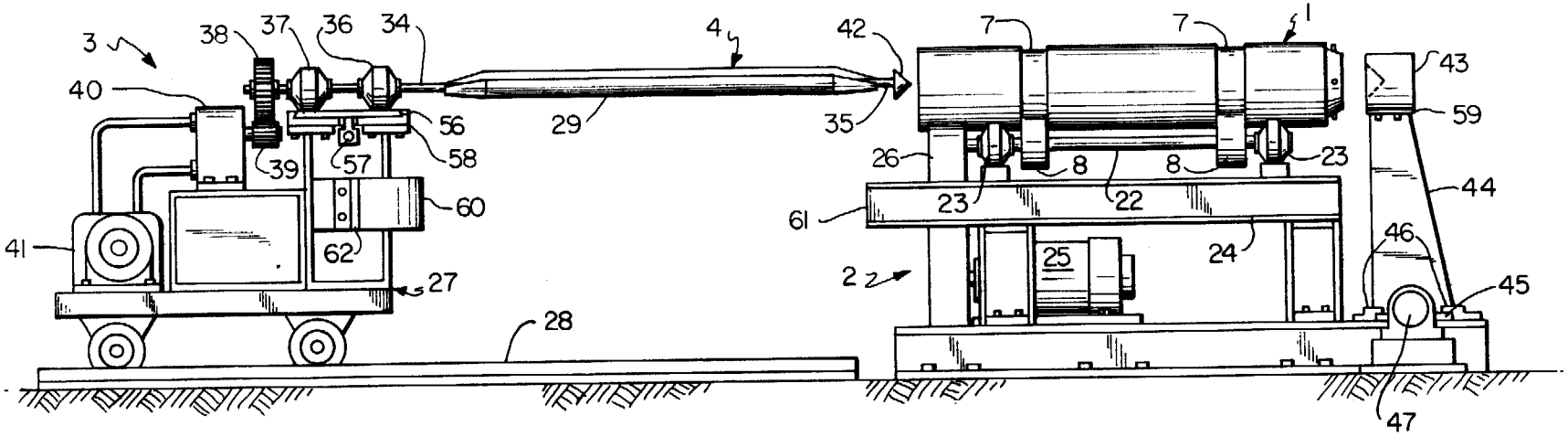
FIG. 5 is a side elevational view of the apparatus of FIGS. 2–4 incorporated in a typical installation.
Figure 6:
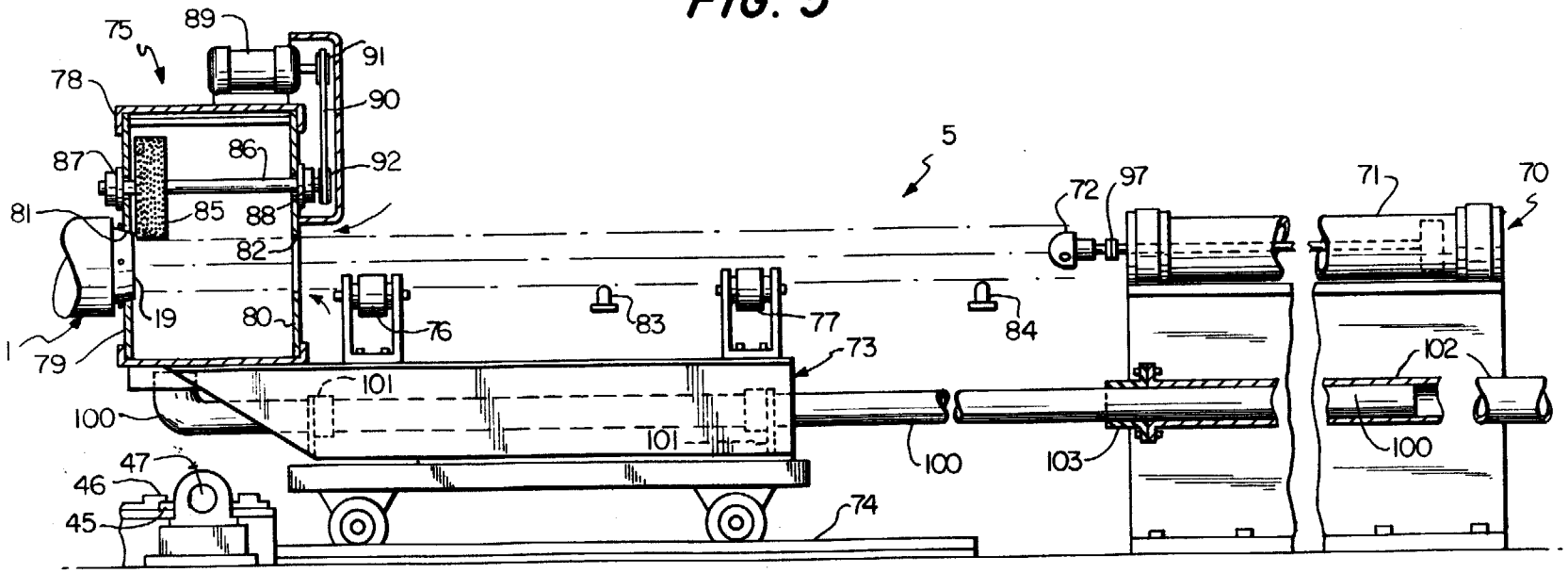
FIG. 6 is a side elevational view of apparatus for withdrawing the article cast in the apparatus of FIGS. 2–5 and recovering the refractory material.

Apparatus for carrying out the method typically comprises a mold, indicated generally at 1, FIGS. 2 and 5; means 2, FIG. 5, for supporting and rotating the mold; means indicated generally at 3, FIG. 5, for supplying the refractory material to the mold, the supply means 3, FIG. 5, including a combined trough and contouring tool 4, FIGS. 2, 4 and 5, which also serves to recover excess refractory material at the time the refractory lining is established; and the combined casting puller and refractory recovery device indicated generally at 5, FIG. 6. Also employed, but not shown, is any suitable conventional means for supplying the molten casting metal to the mold, typically a pouring "boot" which can be brought into position at the end of the mold from which the castings are pulled.

The body of mold 1 is in the form of a thick walled tube 6 having two axially spaced outwardly opening transverse annular grooves 7 to accommodate the usual supporting and driving rollers 8, FIG. 5. Mold body 1 has a right cylindrical inner surface 9 which is the active surface of the mold. At one end, body 1 is recessed to receive a transverse annular end ring 10 which is secured by bolts 11 with its inner periphery 12 concentric with the longitudinal axis of the surface 9. End ring 10 has a tubular extension 13 embraced by surface 9. The inner surface of extension 13 is formed with transverse annular steps the forward edges 14 of which all lie in a conical plane which tapers outwardly of the mold and toward the longitudinal axis of surface 9 at an angle a which is less than the angle of repose of the particulate refractory material to be used for the mold lining. At its opposite end, mold body 1 is equipped with a second end ring 15 which has a stepped inner surface complementary to that of ring 10, the steps of ring 15 presenting transverse circular edges 16 all lying in a conical plane tapering outwardly of the mold and toward the longitudinal axis of surface 9 at the same angle as for ring 10. The outer surface of ring 15 includes an inwardly tapering frusto-conical portion 17 embraced by a matching surface portion 18 on the mold body 1. Body 1 has an axially extending tubular projection 19 having a plurality of radial bores each accommodating one of a plurality of drive keys 20 dimensioned to force end ring 15 into the seated position seen in FIG. 2. The circular inner periphery 21 of ring 15 is concentric with the longitudinal central axis of surface 9.

Four rollers 8 can be employed in spaced pairs to cradle the mold 1 and are secured to shafts 22, FIG. 5, supported by bearings 23 mounted on stationary frame 24, shafts 22 being driven by a DC electric motor 25 through a conventional V-belt drive 26.

Trough and contouring tool 4, which forms part of the refractory supply means 3, is of such size as to occupy a substantial part of the free space within the mold and must therefore be completely withdrawn preparatory to introduction of the molten casting metal. Accordingly, the combined trough and contouring tool 4 is carried by a car 27, FIG. 5, operating on rails 28 so arranged that the car can be moved to the right (as viewed in FIG. 5) for insertion of the device 4 axially into the mold, and then moved in the opposite direction to withdraw device 4 completely once the refractory lining has been established on active surface 9 of the mold and contoured to the desired form.

As best seen in FIG. 4, device 4 comprises an elongated trough 29 of generally U-shaped transverse cross-section. Rigid transverse partitions 30, 31 are secured within the trough and are spaced apart by a distance slightly less than the space between the inner ends of rings 10 and 15, FIG. 2. Commencing at the partitions 30 and 31, the trough is provided with tapered end portions 29 a and 29b respectively, the angle of taper and the transverse dimensions of the end portions being such that the tapered end portions will not interfere with refractory material overlying the end rings 10 and 15. Additional partitions 32, 33 are secured at the respective ends of the trough. Trunnions 34, 35 are provided at the respective ends of the trough, the inner portions of the trunnions passing through openings in the respective partitions 30, 31 and 32, 33 and being rigidly secured, as by welding, to the partitions. Trunnions 34 and 35 are coaxial and so positioned as to establish an axis of rotation for the trough which is off center, as later described. Trunnion 34 is considerably elongated, so as to be accommodated by two trunnion bearings 36 and 37, FIG. 5, and to project beyond bearing 37. A gear 38 is fixed to the projecting end of trunnion 34 and meshes with a drive pinion 39 fixed to the output shaft of a hydraulic motor 40 powered by a pump 41, the entire assembly being suitably mounted on car 27.

A tapered plain rotary bearing member 42, FIG. 4, is rigidly mounted on the end of trunnion 35 to cooperate with a corresponding stationary bearing member 43, FIG. 5, supported by a pedestal 44. Pedestal 44 has a base 45 slidably retained in a horizontal keyway 46 which extends at right angles to the longitudinal axis of the mold so that, by movement of the pedestal along the keyway, the stationary bearing member 43 can be moved between the active position seen in FIG. 5, in which bearing members 42 and 43 are coaxial, and an inactive position in which pedestal 44 is displaced laterally from the mold to allow free pulling of the casting and to allow the pouring boot (not shown) to be moved to its pouring position. A fluid pressure operated rectilinear power device 47 is provided to move the pedestal between the active and inactive positions.

Device 4 is completed by an elongated contouring blade 48 rigidly secured to and extending along one longitudinal edge 49 of the wall of trough 29. The main body 50 of blade 48 extends throughout the full space between partitions 30 and 31. In the case where the centrifugal casting operation is to produce a tubular blank made up of six cylinder liner blanks of the configuration seen in FIG. 1 joined flange-end-to-flange-end, the active edge of contouring blade 48 is formed with three identical projections 51 each having a profile, as best seen in FIG. 2, identical to that presented by two of the enlargements F joined end-to-end. The remainder of the active edge of the main body of blade 48 is a simple straight edge and is parallel to the axis of rotation defined by trunnions 34 and 35 and their respective bearings. Beyond partition 30, blade 48 continues as a straight edged blade portion 52 secured at one end to the adjacent end of body 50 and at the other end to trunnion 34. Beyond partition 31, blade 48 similarly continues as a straight edged blade portion 53.

As seen in FIG. 3, the transverse cross-section of trough 29 can be generally circular, with the mouth of the trough defined by a plane which is chordal relative to the circular cross-section. Main body 50 of the contouring blade can then be flat and extend in a plane which is essentially tangential to the circular cross-section with the point of tangency being substantially at one edge of the mouth of the trough. The body 50 can be secured to the trough in any suitable fashion, as by an external bridging strip 54 and screws 55. Considering that the trough is shown in its upright position in FIG. 3 with the circular cross-section concentric with the longitudinal central axis of mold surface 9, which is the axis of rotation of the mold, it will be noted that the common axis for trunnions 34, 35 is offset along a line slanting at 45° downwardly and to the left (as viewed) from the axis of rotation of the mold. The trough is thus eccentric with reference to the cylindrical active mold surface, but the extent of eccentricity is such that the outer edge of contouring blade 48 will clear surface 9 when the device 4 is rotated counterclockwise from the position seen in FIG. 3 to the position seen in FIG. 3A.

Figure 3A:
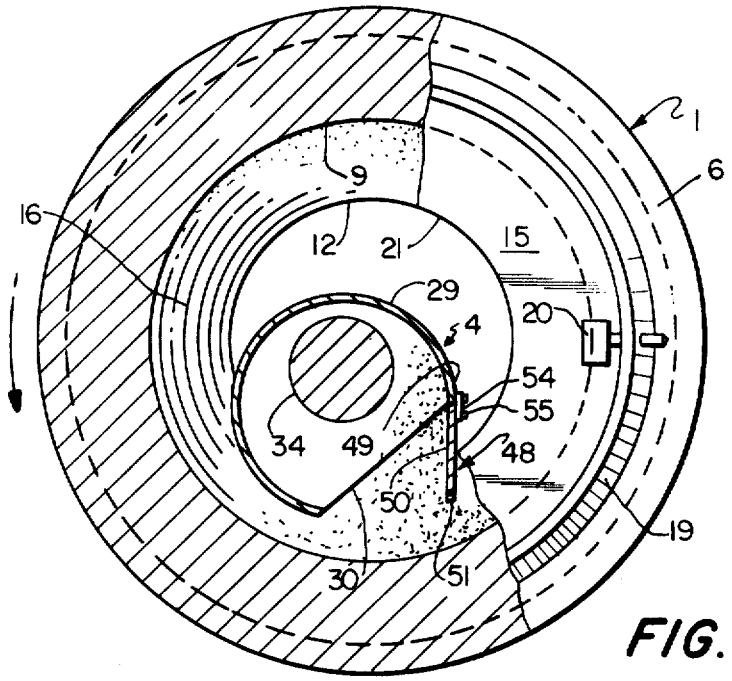
Figure 3B:
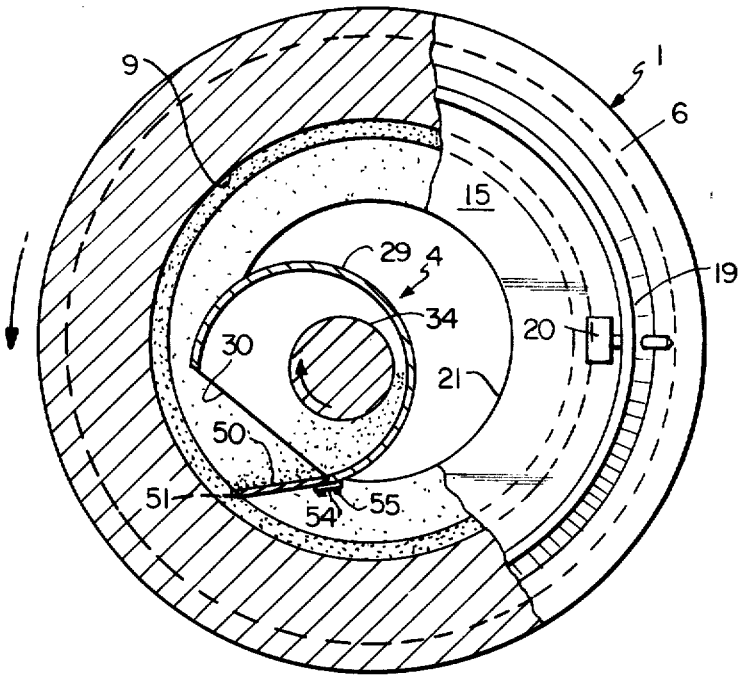

Since device 4 is eccentric with respect to mold surface 2, there is a given rotational position for device 4 in which the edge of contouring blade 48 is at its point of closest proximity to the mold surface, that position being illustrated in FIG. 3B. The proximity of the contouring blade will determine the thickness of the finished refractory lining and is thus dependent upon the outer diameter desired for the casting. In order that the position of the contouring blade relative to the mold can be predetermined accurately, the transverse horizontal position of car 27 is fixed, the bearings 36 and 37 are mounted on a keyway 56, FIG. 5, for transverse horizontal adjustment by screw 57, with the vertical position of bearings 36 and 37 being adjustable by shimming at 58, and conventional means (not shown) is provided for vernier adjustment of pedestal 44 along its keyway 46 to horizontally adjust the position of bearing member 43. Vertical adjustment of bearing member 43 is accomplished by shimming at 59. Because of wheel play and like variables, rails 28 do not locate car 27 in a precise transverse horizontal position. Accordingly, to achieve a precise horizontal base position for car 27, and thus for trunnion 34, the car is provided with two forwardly projecting locator bars 60, FIGS. 5 and 5A, each located at a different side of the car and each having an outer face which slants forwardly and toward the longitudinal center line of the car. The stationary frame of mold supporting and rotating unit 2 is provided with two locator beams 61 which project toward the location of car 27 on rails 28 and are spaced apart by a distance such that, as the car approaches unit 2, the outer face of each locator bar 60 on the car is engaged by the end of a different one of the two locator beams 61 and the car is therefore constrained to a position centered between beams 61. Unit 2 is so constructed and arranged that the axis of rotation of mold 1 is centered between beams 61. Each locator bar 60 is equipped with an outwardly projecting stop flange 62 disposed to engage the end of the corresponding locator beam 61 when forward motion of car 27 brings bearing member 42 into seated relation with respect to bearing member 43. Movement of car 27 can be accomplished by a rectilinear hydraulic power device in wellknown fashion.

The particulate refractory material is charged to trough 29, uniformly throughout the length of the trough, when car 27 is in a position, as in FIG. 5, such that trough 29 is entirely removed from mold 1. With trough 29 maintained in its upright position, car 27 is then moved to insert device 4 through mold 1, such movement being continued until bearing member 42 is seated in bearing member 43 and locator beams 61 are engaged by stop flanges 62. By operation of motor 40, device 4 is rotated counterclockwise until the position seen in FIG. 3A is reached, with the result that the total quantity of particulate refractory material in the trough is discharged into the mold. According to the method, that quantity of refractory material is substantially in excess, typically 150%, of that required to form the desired lining. Though the initial layer of particulate refractory material can be established with the mold rotating at any practical rate when the particulate material is discharged from the trough, best distribution and lowest cycle times are achieved if the mold is stationary or rotating at a rate providing a centrifugal force not more than 15 gravities at the time the trough is rotated to discharge the material. Using refractory materials, such as zircon flour, which have a relatively high specific gravity, the rate of mold rotation used to distribute the material centrifugally may be adequate to densify the layer of refractory material preparatory to contouring. When the total quantity of particulate material has been distributed in an even relatively thick layer as a result of rotation of the mold, and densification has been accomplished, device 4 is rotated clockwise until, as seen in FIG. 3B, the edge of blade 48 is at its point of nearest proximity to surface 9. With device 4 in that position, the outer edge of contouring blade 48 engages the layer of particulate refractory material on surface 9 at an angle such that the refractory material approaches the side of blade 48 which faces the open mouth of trough 29. Accordingly, the blade deflects all of the excess refractory material back into trough 29, where it is retained by the combination of the trough and the contouring blade, and the ultimate effect is that blade 48 planes the layer of refractory material to the precise thickness and profile (limited only by the angle of repose of the particulate refractory material) desired for the final lining. Thus, the main straight edge portion of blade 48 establishes right cylindrical surfaces on the layer, indicated at 62, FIG. 2A, while portions 51 of the blade established the surfaces 63, 63a and 63b to define the groove for casting of the end flange portions F of the cylinder liner blank seen in FIG. 1. In actual practice, device 4 is rotated clockwise from the position seen in FIG. 3A continuously at a slow rate, in comparison to the rate of rotation of the mold, to the position shown in FIG. 3, so that the contouring blade simply passes through the position seen in FIG. 3B. The excess refractory material returned to the trough 29 by the action of blade 48 simply remains in trough 29, when device 4 is withdrawn from the mold, and constitutes part of the refractory material to be used for the next casting.

When the initial charge of particulate refractory material is delivered to trough 29, the end portions 29a and 29b of the trough receive quantities of refractory material adequate to cover the stepped surfaces presented respectively by end rings 10 and 15. Because the exposed edges 14 and 16 of the steps of rings 10 and 15, respectively, constitute in effect a tapered surface at an angle less than the angle of repose of the refractory material, the material discharged by the end portions of the trough remains in position on the stepped surfaces of the end rings and this material is shaped to provide the smooth frusto-conical surface portions 64 and 65 of the finished lining, as seen in FIG. 2. The excess refractory material from these areas is returned to the respective end portions of the trough by portions 52 and 53 of the contouring blade as device 4 passes through the position seen in FIG. 3B during return of device 4 to its initial position.

It will be noted that provision of the stepped surfaces of end rings 10 and 15, and provision of end portions 52 and 53 of the contouring blade, eliminates the need for inserting the usual pre-formed sand cores to retain the molten casting metal. The refractory lining produced according to the invention is a completely monolithic lining from end ring to end ring, presents no seams or lining joints, is of precisely desired radial thickness, and has precisely the profile presented by the contouring blade.

With a mold dimensioned for the cylinder liner blank hereinbefore described with reference to FIG. 1, the rate of rotation of the mold can be increased to 500 r.p.m. for hardening the refractory lining and then further increased to, e.g., 900 r.p.m. preparatory to introduction of the molten casting metal.

Device 4 having been removed, motor 47 is now operated to move pedestal 44 and bearing 43 away from the end of the mold, and the pouring boot (not shown) is swung into place and the molten casting metal poured through end ring 15 in conventional fashion. The pour is accomplished conventionally, with the mold being rotated at a casting rate, e.g., 800–900 r.p.m., to distribute the molten metal centrifugally. At this stage, lining surfaces 64 and 65, FIG. 2, serve as end dams to prevent escape of the metal from the mold. The casting is cooled conventionally. For cooling, a water spray can be directed against the outer surface of mold by the usual spray means (not shown).

The pouring boot is removed and, with pedestal 44 remaining in its displaced position, unit 5, FIG. 6, is employed to withdraw the casting from the mold and to recover the refractory material of the lining. Unit 5 includes a conventional puller 70 mounted in fixed position with its fluid pressure operated motor 71 aligned coaxially with the mold so that, when the piston rod of the motor is fully projected, puller head 72 is located within one end of the casting, the position of the puller 70 thus being spaced from the mold by a distance somewhat less than the maximum excursion of head 72. Operation of the puller is conventional, and it will be understood that end ring 15 is removed prior to pulling of the casting from the mold.

A car 73 is located between puller 70 and unit 2 and is supported by rails 74 for movement parallel to the longitudinal axis of the mold supported by unit 2. Car 73 carries a refractory collecting unit 75 and two pairs of casting support rollers 76 and 77. Unit 75 comprises a housing 78 having flat end walls 79 and 80, the housing being rigidly mounted on car 73. End walls 79 and 80 are vertical, extend transversely of the central axis of the mold supported by unit 2, and are spaced apart in the direction of that axis. Nearer the mold, wall 79 has a circular opening 81 sized and positioned to slidably embrace the tubular end extension 19 of the mold body. Disposed nearer the puller, end wall 80 has a circular opening 82 which is coaxial with opening 81 and of a diameter significantly larger than the largest outer diameter to be pulled. End walls 79 and 80 are spaced apart by a distance smaller than the length of the casting. Support rollers 76, 77 are located on the side of housing 78 which is nearer puller 70. Rails 83 and 84 are mounted to extend transversely relative to the axis of the mold supported on unit 2 and include cantilevered end portions which project below the path travelled by the casting as it is pulled, rail 83 being between rollers 76 and 77 while rail 84 is between car 73 and puller 70. Rails 83 and 84 are spaced apart by a distance shorter than the length of the casting but longer than the total excursion of support roller pair 77 as car 73 is moved between its active position FIG. 6, and an inactive position (not shown), chosen to make room for the pouring boot and for bearing pedestal 44. When car 73 is in its active position, with wall 79 of housing 78 engaged with the mold, operation of the puller to extend its piston rod causes puller head 72 to pass through openings 80 and 79 and into the adjacent end of the mold for engagement with the casting. When the puller is operated to retract its piston rod, the casting is drawn first through opening 81, then through the interior of housing 78, then through opening 82, thence onto supporting rollers 76 and 77 and, when pulling ceases, onto rails 83, 84.

It is to be noted that, if six cylinder liner blanks such as that shown in FIG. 1 are made in a single casting, with the liner blanks joined flanged end to flanged end, the casting is in the nature of a single pipe-like piece which is of uniform outer diameter save for the three transverse annular enlargement formed by the three grooves in the refractory lining of the mold, the six liner blanks ultimately being separated by cutting the casting at the midpoint of each enlargement and at the midpoint of each body section.

Save for openings 81 and 82, housing 78 is air-tight. The housing projects well above the location of the mold. A rotary brush 85 is supported within housing 78, above the path of travel of castings pulled through the housing, by a shaft 86 journelled in bearings 87, 88 secured respectively to end walls 79 and 80. A drive motor 89 is mounted on the top wall of housing 78 and drives shaft 86 and brush 85, as by V-belt 90 and pulleys 91, 92. As seen in FIG. 7, brush 85 is of the centrifugal bristle type and comprises a hub 93, secured to shaft 86, and two side discs 94 between which a circumferentially spaced series of bristle support pins 95 extend, the support pins being secured to the side discs. Each pin 95 supports a plurality of bristles 96 formed of heavy, stiff but resilient wire, one end 97 of each bristle being bent circularly to loosely embrace its respective support pin. When shaft 86 is rotated, bristles 96 are caused to extend radially from the brush by centrifugal force. The location of shaft 86 and the effective diameter of brush 85 are such that, with motor 89 operated to rotate the brush as the casting is withdrawn, the bristles of the brush impinge upon the outer surface of the casting and dislodge any refractory material which has not already fallen from the casting. Puller head 72 is mounted on the piston rod of puller 70 by means of a rotary connector 97, FIG. 6, so that the puller head is free to rotate about the axis of the piston rod. Pulling of the casting is accomplished while the mold is still being rotated, through at a very slow rate, by support and drive rollers 8. Accordingly, the casting is rotating slowly about its longitudinal axis as it is pulled through housing 78 and past brush 85, and the bristles 96 of the brush thus strike all portions of the outer surface of the casting.

Since the particulate refractory lining material contains no binder material and is itself virtually unaffected at casting temperatures, all of the refractory material is dislodged from the casting by the pulling and brushing operation.

Figure 8:
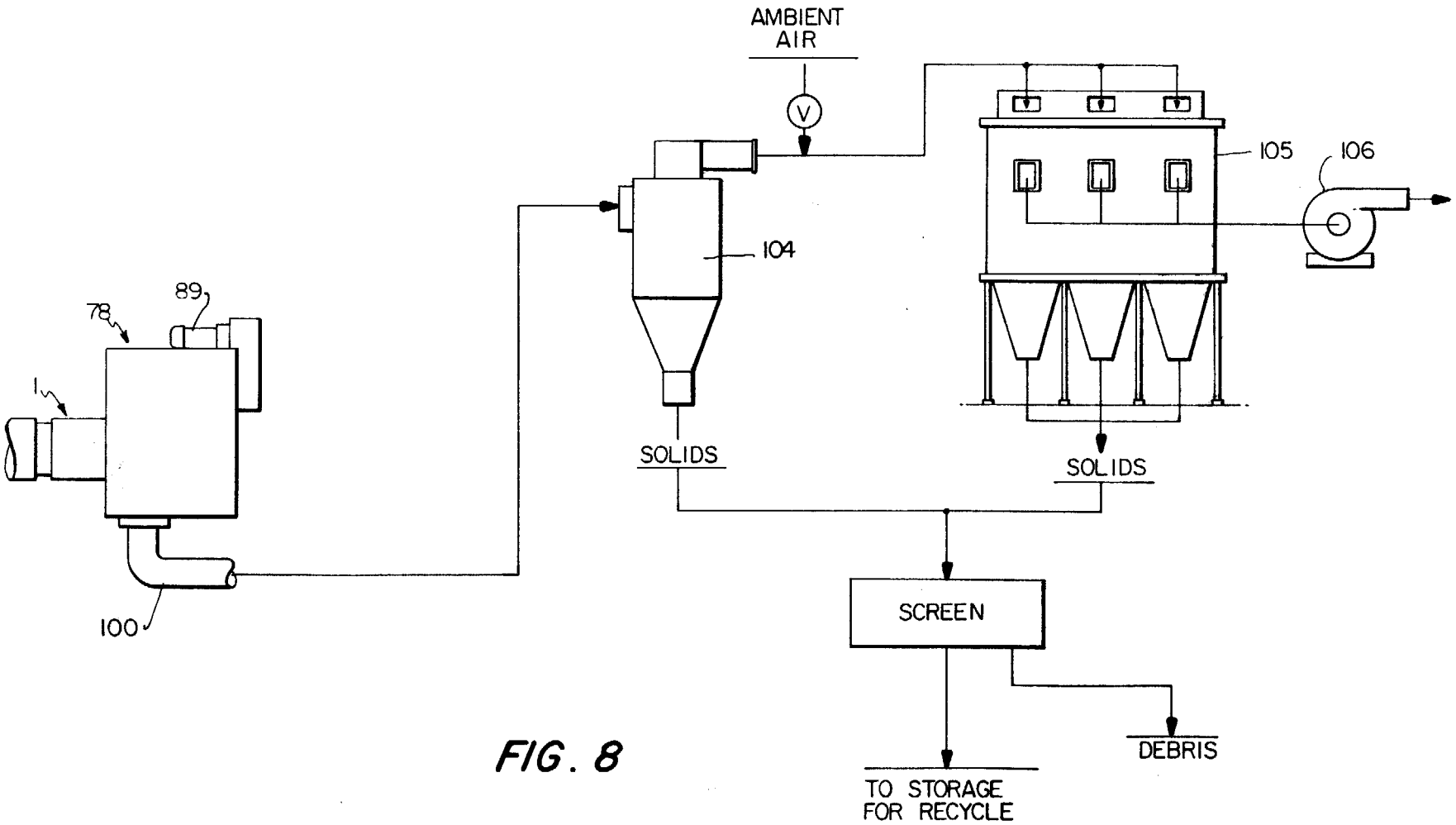
FIG. 8 is a schematic diagram of a system for recycling the recovered refractory material.

An exhaust duct 100 is connected to an opening in the bottom wall of housing 78 and extends horizontally lengthwise of car 73, being mounted rigidly on the bed of the car, as by brackets 101. A straight portion of duct 100 projects horizontally beyond car 73 and is telescopically engaged within a stationary horizontal duct 102 rigidly secured to the base of the puller unit. A tubular slip seal 103 is provided at the end of duct 102 to seal between stationary duct 102 and movable duct 100. Duct 102 leads to the intake of a centrifugal separator 104, FIG. 8. Air flowing from separator 104 is delivered to the intakes of a conventional bag filter 105, the fluid outlets of which are connected to the intake of a centrifugal blower 106. Solids separated by centrifugal separator 104 and bag filter 105 are combined and supplies to a screen sized to remove debris, such as metal fragments, and the clean recovered refractory material is delivered to storage for recycle.

The air intake for housing 78 is constrained to the interior of the mold and the small space between the wall of opening 82 and the casting. With blower 106 operating to provide a high volume flow rate, air flow through the mold into chamber 78 is adequate to pick up and convey to chamber 78 the greater proportion, e.g., 90% of all refractory material remaining in the mold after pulling of the casting. In this connection, it is to be noted that, as the casting is pulled, the transverse outer enlargements formed by lining grooves 63 tend to scrub the refractory material toward housing 78, and this action also tends to break up any agglomerates or clusters of particles returning the residual refractory material to its free flowing particulate state. Further, since blower 106 can draw air only from the mold and opening 82, the air inflow to housing 78 is generally along the surface of the casting being pulled, and the air flow into the housing therefore tends to scrub the outer surface of the casting.

[EMBODIMENT] *APPARATUS* OF FIG. 9

In the method and apparatus embodiments described above, the active surface of the mold is right cylindrical, and the outer enlargement for the casting is accommodated by the thickness of the refractory lining. In some cases, however, it is desirable to contour the active surface of the metal mold, particularly in the case of relatively large castings which should be cast one at a time. Thus, as seen in FIG. 9, the active surface 109 of the mold can be machined to provide a surface portion 109a of increased diameter in the area to be occupied by the outer enlargement of the casting, the smaller diameter right cylindrical main portion 109 and portion 109a being interconnected by a frusto-conical portion 109b. The layer of particulate refractory material to form the refractory lining is then established as described with reference to FIGS. 2–8, with the layer being shaped by a contouring tool so dimensioned and shaped that the portion 110a of the lining overlying mold surface portion 109a is markedly thinner than the main body of the lining. The lining portion 110b overlying mold surface portion 109b tapers in thickness uniformly from that of main body 110 to thin portion 110a. Main body portion 110 of the lining is right cylindrical. Higher heat transfer through the thin portion of the lining is thus preserved, even though the mold has been machined to partially accommodate the outer enlargement of the casting, and the metal in this area will not chill too rapidly or cool too slowly.

I claim:

1. In the production of tubular metal articles by centrifugal casting in a hollow metal mold having an active mold surface which is of circular cross-section transverse to the axis of mold rotation, the improvement comprising introducing into the mold a quantity consisting essentially of a dry finely particulate binderless free flowing *milled* refractory material, said refractory material being inert at the temperature of the molten metal to be cast and having a melting point significantly higher than the temperature of the molten metal to be cast, a specific gravity of at least 2.25, and a particle size such that at least 95% of the particles have a maximum dimension not exceeding 105 microns;

rotating the mold to distribute said quantity of refractory material centrifugally and thereby establish over the entire active surface of the mold a layer of said refractory material which is thicker than desired for casting;

densifying the layer of refractory particulate material by rotating the mold at a rate such that the particulate refractory material is subjected to centrifugal force adequate to establish an equivalent specific gravity, determined by multiplying the actual specific gravity of the refractory material by the number of gravities of centrifugal force, or at least 7.5;

contouring the inner surface of said layer, to the form desired for the article to be cast, by positioning against the inner portion of the layer, while continuing to rotate the mold, a contouring tool having a working edge which extends longitudinally of the mold and which has a longitudinal profile identical with that desired for the article to be cast, said quantity of refractory material, and the position of said contouring tool relative to the active mold surface, being such that, after contouring, the thinnest portion of said layer will have a thickness equal to at least 5 times the maximum dimension of the particles of the [predominent] *predominant* fraction of the particulate material and significantly greater than the maximum dimension of the largest particle in the particulate material [;] *, the particles of the layer, after densifying and contouring the layer, being so packed together in the layer that the voids at the surface of the layer are too small to be entered by the molten metal;* rotating the mold at a casting rate such as to apply to the densified and contoured layer a centrifugal force of at least 10 gravities; and introducing the molten metal for casting while continuing to rotate the mold at said casting rate, rotation of the mold being continued at said casting rate at least until the molten metal has covered the inner surface of the densified layer of refractory material.

2. The method as defined in claim 1, and further comprising recovering the cast article and said refractory material from the mold;

classifying the recovered refractory material to remove any debris;

and using the recovered refractory material for casting another article.

3. The method according to claim 1, wherein said refractory material is zircon flour.

4. The method according to claim 1, wherein the particles of said refractory material are predominantly smaller than 43 microns.

5. The method according to claim 1, wherein the metal to be cast is iron; and said refractory material is zircon flour the particles of which are predominantly smaller than 43 microns.

6. The method according to claim 5, wherein after contouring of the densified layer, the rate of rotation of the mold is increased until a centrifugal force of at least 10 gravities is applied to the contoured layer preparatory to casting, such increased centrifugal force causing the contoured lining to be hardened.

7. The method according to claim 1, wherein the metal to be cast is iron;

said refractory material is magnesium oxide; and said step of densifying the layer of refractory material is carried out by rotating the mold at a rate such that the refractory material is subjected to a centrifugal force of at least 24 gravities.

8. The method according to claim 1, wherein the metal to be cast is iron;

said refractory material is silica flour the particles of which are predominantly smaller than 45 microns; and said step of densifying the layer of refractory material is carried out by rotating the mold at a rate such that the refractory material is subjected to a centrifugal force of at least 33 gravities.

9. The method according to claim 1, wherein said quantity of particulate refractory material introduced into the mold is in excess of that required to form the completed mold lining;

the method further comprising recovering the excess refractory material concurrently with said contouring step.

10. The improvement according to claim 1 wherein the article to be cast includes a transverse annular enlargement;

The contouring tool employed to accomplish said contouring step including a portion providing in the densified layer of refractory particulate material a transverse annular groove conforming to said transverse annular enlargement, the shape and orientation of the contouring tool being such that the portion of said layer at the bottom of said groove has a thickness equal to at least five times the maximum particle dimension of the predominant fraction of the particulate refractory material, other portions of the densified layer having a thickness substantially greater than the thickness of the portion of the layer at the bottom of said groove;

the metal to be cast is iron; and the cast article is characterized by having AFA Type A graphite distributed throughout its inner surface and throughout at least a substantial portion of the thickness of the transverse annular enlargement.

11. In the production of tubular metal articles by centrifugal casting, the improvement comprising providing a rotary metal mold having an active mold surface which is of circular cross-section transverse to the axis of mold rotation and which is longer than the article to be cast, said mold being essentially free of vent apertures;

introducing into the mold a quantity consisting essentially of a dry finely particulate binderless free flowing *milled* refractory material which is inert at the temperature of the molten metal to be cast and which has a melting point significantly higher than the temperature of the molten metal to be cast, a specific gravity of at least 2.25, and a particle size such that at least 95% of the particles have a maximum dimension not exceeding 105 microns;

rotating the mold to distribute said quantity of refractory material centrifugally and thereby establish over the entire active mold surface, including the end portions thereof, a layer of said refractory material which is thicker than desired for casting;

densifying the layer of particulate refractory material by rotating the mold at a rate such that the particulate refractory material is subjected to centrifugal force adequate to establish an equivalent specific gravity, determined by multiplying the actual specific gravity of the refractory material by the number of gravities of centrifugal force, of at least 7.5; [and]

contouring the inner surface of the densified layer by positioning against the inner portion of the layer, while continuing to rotate the mold at least at the rate employed for densification, a contouring tool having a working edge extending longitudinally of the mold and which includes a main body portion having a longitudinal profile identical with that desired for the article to be cast, and two end portions each of which slants axially outwardly relative to the respective end of the mold and generally toward the longitudinal axis of the mold at an angle less than the angle of repose of the particulate refractory; [; and], *the particles of the layer, after densifying and contouring the layer, being so packed together in the layer that the voids at the surface of the layer are too small to be entered by the molten metal; and* introducing the molten metal for casting while continuing to rotate the mold, rotation of the mold being continued at said rate at least until the molten metal has covered the inner surface of the densified layer of the refractory material, the densified layer of refractory material including two frusto-conical end portions, formed by the respective end portions of the contouring tool, which confine the molten metal to the contoured surface of the layer of refractory material.

12. The improvement defined in claim 11 and further comprising recovering the excess refractory material concurrently with said contouring step.

13. The improvement defined in claim 11, wherein said refractory material is zircon flour the particles of which are predominantly smaller than 43 microns.

14. In the production of tubular metal articles by centrifugal casting, the method for accomplishing casting without the use of end cores, comprising providing a rotary metal mold having an elongated generally cylindrical active mold surface and, at each end thereof, a generally frusto-conical end ring which tapers axially outwardly and toward the longitudinal axis of the mold;

introducing into the mold a quantity consisting essentially of a dry finely particulate binderless free flowing *milled* refractory material which is inert at the temperature of the molten metal to be cast and which has a melting point significantly higher than the temperature of the molten metal to be cast, a specific gravity of at least 2.25, and a particle size such that at least 95% of the particles have a maximum dimension not exceeding 105 microns, the angle at which the end rings taper being less than the angle of repose of the refractory material;

rotating the mold to distribute said quantity of refractory material centrifugally and thereby establish over the entire active surface of the mold and said end rings a layer of said refractory material which is thicker then desired for casting;

densifying the contoured layer of particulate refractory material by rotating the mold at a rate such that the particulate refractory material is subjected to centrifugal force adequate to establish an equivalent specific gravity, determined by multiplying the actual specific gravity of the refractory material by the number of gravities of centrifugal force, of at least 7.5 [; and] , *the particles of the layer, after densifying and contouring the layer, being so packed together in the layer that the voids at the surface of the layer are too small to be entered by the molten metal; and* contouring the inner surface of the densified layer by positioning against the inner surface of the layer, while continuing to rotate the mold, a contouring tool having a working edge which extends longitudinally of the mold and includes a main body portion having a longitudinal profile identical with that desired for the article to be cast, and two end portions slanting in general conformity to said end rings; and introducing the molten metal for casting while rotating the mold at a casting rate, rotation of the mold being continued at said casting rate at least until the molten metal has covered the inner surface of the densified layer of refractory material, the portions of the densified layer which overlie said end rings serving to confine the molten metal within the mold.

15. The method defined in claim 14 wherein said refractory material is zircon flour the particles of which are predominantly smaller than 43 microns.

16. The method for producing a tubular iron article having a cylindrical main body and an outer transverse annular enlargement by centrifugal casting with the finished article characterized by having AFA Type A graphite throughout its inner surface portion and for at least a substantial portion of the thickness of the transverse annular enlargement, comprising providing a rotary metal mold having an active mold surface which is of circular cross-section transverse to the axis of mold rotation;

introducing into the mold a quantity consisting essentially of a dry finely particulate binderless free flowing *milled* refractory material which is inert at the temperature of the molten iron to be cast and which has a melting point significantly higher than that of the molten iron to be cast, a specific gravity of at least 2.25, and a particle size such that at least 95% of the particles have a maximum dimension not exceeding 105 microns;

rotating the mold to distribute said quantity of refractory material centrifugally and thereby establish over the entire active mold surface a layer of said refractory material which is thicker than the radial height of the outer transverse annular enlargement of the article to be cast;

densifying the layer of particulate refractory material by rotating the mold at a rate such that the particulate refractory material is subjected to centrifugal force adequate to establish an equivalent specific gravity, determined by multiplying the actual specific gravity of the refractory material by the number of gravities of centrifugal force, of at least 7.5;

contouring the inner surface of the densified layer to the profile desired for the article to be cast and thereby providing in said layer a transverse annular groove conforming to the shape of the transverse annular enlargement, said layer being substantially thinner at said groove than in the area which is to define the main body of the article to be cast [;] , *the particles of the layer, after densifying and contouring the layer, being so packed together in the layer that the voids at the surface of the layer are too small to be entered by the molten iron;* introducing the molten iron for casting while rotating the mold at a casting rate, rotation of the mold being continued at the casting rate at least until the molten iron has covered the inner surface of the densified layer of refractory material; and allowing the iron to solidify by cooling while continuing to rotate the mold, excessive chilling of the iron which fills the groove in said lining being inherently prevented by heat transfer from the main body of the casting to compensate for the more rapid loss of heat through said thinner portion of said layer.

17. The method defined in claim 16, wherein said refractory material is zircon flour the particles of which are predominantly smaller than 43 microns.

*18. The method according to claim 1, wherein the particles of said refractory material are predominantly smaller than 74 microns.*

*19. An as-cast engine cylinder liner black cast from grey iron according to the method defined in claim 10, the outer surface of the as-cast blank formed by being cast directly against the mold lining being especially smooth and essentially free of embedded refractory particles;*

*all portions of the as-cast blank not cast against said groove being characterized by predominantly AFA Type A graphite at the inner surface and throughout the radial thickness of the as-cast blank;*

*that portion of the blank cast against said groove being characterized by predominantly AFA Type A graphite at the inner surface and throughout a major portion of the radial thickness of that portion.*

*20. An as-cast engine cylinder liner blank cast from grey iron according to the method defined in claim 16, the outer surface of the as-cast blank formed by being cast directly against the mold lining being especially smooth and essentially free of embedded refractory particles;*

*all portions of the as-cast blank not cast against said groove being characterized by predominantly AFA Type A graphite at the inner surface and throughout the radial thickness of the piece;*

*that portion of the blank cast against said groove being characterized by predominantly AFA Type A graphite at the inner surface and for more than one-half of the radial thickness of a transverse annular enlargement formed by being cast against said groove.*

*21. An as-cast tubular blank cast from grey iron according to the method defined in claim 1 to be converted into a completed article by a minimum amount of finish machining, the as-cast blank having a smooth outer surface formed by being cast directly against the mold lining and which is essentially free of embedded refractory particles;*

*the as-cast blank including a wall portion of uniform radial thickness and the cast iron of that wall portion being characterized by AFA Type A graphite not only at the inner surface but also throughout the radial thickness of the wall portion.*

* * * * *